United States Patent [19]

Hässler et al.

[11] Patent Number: 4,537,745
[45] Date of Patent: Aug. 27, 1985

[54] METHOD OF PRODUCING COPPER-CHROMIUM FUSION ALLOYS AS CONTACT MATERIAL FOR VACUUM POWER SWITCHES

[75] Inventors: Heinrich Hässler, Wendelstein; Reiner Müller, Steinbach; Horst Kippenberg, Herzogenaurach; Norbert Prölss, Wendelstein, all of Fed. Rep. of Germany

[73] Assignee: Siemens Aktiengesellschaft, Berlin and Munich, Fed. Rep. of Germany

[21] Appl. No.: 574,792

[22] Filed: Jan. 27, 1984

[30] Foreign Application Priority Data

Jan. 31, 1983 [DE] Fed. Rep. of Germany ....... 3303170

[51] Int. Cl.³ ................................................ C22C 1/02
[52] U.S. Cl. .................... 420/590; 75/10 R; 75/10 C; 75/65 EB; 75/65 ZM; 219/121 PB; 219/121 LF; 420/495; 420/428
[58] Field of Search ............... 75/65 R, 10 R, 65 EB, 75/65 ZM, 10 C; 420/495, 590, 469, 428; 219/121 PB, 121 CF

[56] References Cited

U.S. PATENT DOCUMENTS

| 3,125,441 | 3/1964 | Lafferty et al. | 75/65 ZM |
| 3,615,345 | 10/1971 | King | 75/6 B E |
| 3,827,883 | 8/1974 | Neely | 420/495 |
| 4,008,081 | 2/1977 | Hundstad | 420/495 |
| 4,481,030 | 11/1984 | Schmidt et al. | 75/10 C |

FOREIGN PATENT DOCUMENTS 152144 11/1980 Japan ................................. 420/495

Primary Examiner—L. Dewayne Rutledge
Assistant Examiner—Christopher W. Brody
Attorney, Agent, or Firm—Karl F. Milde, Jr.

[57] ABSTRACT

A method of producing copper-chromium fusion alloys having a chromium content of at least 25% by mass and at most 60% by mass with a homogeneous macrostructure without lattice defects and without shrink holes or pipes, which can be used as contact material for vacuum power switches with breaking currents exceeding 10kA. According to the invention, during fusing of the starting material to the fusion alloy a superheating to at least 2000° C. is obtained at least in a partial zone of the instantaneous melt volume. Thereafter the melt is cooled at a cooling rate such that no primary Cr precipitation or segregation occurs.

22 Claims, No Drawings

METHOD OF PRODUCING COPPER-CHROMIUM FUSION ALLOYS AS CONTACT MATERIAL FOR VACUUM POWER SWITCHES

BACKGROUND OF THE INVENTION

The invention relates to a method of producing copper-chromium fusion alloys, having a chromium content of at least 25% and at most 60% by mass with a homogeneous macrostructure without lattice defects and without shrink holes or pipes, for use as contact material for vacuum power switches with breaking currents above 10 kA. A starting material for the fusion process is prepared from the alloy components copper and chromium, and then this starting material is melted to form the fusion alloy.

Contact materials for vacuum power switches with breaking currents above 10 kA must, besides the reliable current cutoff, fulfill additional requirements. The contact material must manage high permanent currents of several thousands amperes without an undue temperature increase in the switching tube caused by the resulting dissipated heat. In the interests of an easy and silent drive, there must be little tendency to weld. The contact burnoff should be low enough so that at least 100 short-circuit breaks and 10,000 breaks at nominal current are ensured, with the contact exhibiting a smooth-surface burnoff behavior, for dielectric reasons. The texture and composition of the contact material should be such that the breaking current distribution curve is as narrow as possible and the most frequent value is no higher than 4 A. Lastly it must be assured that as the contact material melts and evaporates, the arc will not release gas components which would lead to a critical pressure increase in the switching chamber of above $10^{-4}$ mbar.

A powder-metallurgically produced sintering/infiltration material which contains chromium and copper as base materials is commonly used as as contact material for vacuum power switches. It is produced from especially pure starting materials under shield gas and/or under vacuum. However, even if it is produced under conditions of high vacuum, perturbation zones and defects occur in the structure which are attributable to the reactivity of the chromium. In the infiltration (impregnation) process, these defects lead to faulty wetting on individual grain surfaces of the skeleton. Such deviations from the ideal structure may affect the burning and movement of the arc on the contact surfaces and may impair the current breaking capacity and voltage strength.

In general these disturbing structural defects are attributable to the presence of stable residual oxides on the outer surfaces of the metal powders used such as the chromium.

Another defect, which also may cause failure of the switching tube, is based on impurities within the chromium grains of the starting material or of non-metallic admixtures in the chromium powder. In electrolytic chromium powders there have occasionally been found in the interior of the grains electrolyte residues, and in the case of aluminothermally produced chromium powders, inclusions or impurities of the powder in the form of $Al_2O_3$ or aluminum-chromium mixed oxides. Since in the normal sintering/infiltration process the skeleton-forming chromium grains are only slightly solubilized, such impurities cannot be released and removed by suitable purification processes or be at least diluted to harmless concentrations in the macrostructure.

The first type of defect described above is critically related to proper functioning of a vacuum switching tube. Under the action of the recurring voltage, defect-related, loosely bound contact material particles may be detached from the structure and cause a voltage puncture. The second type of defect, on the other hand, may lead to quench malfunction due to local release of gas. A simple estimate shows that for reasons of safety not more than about 1 $\mu$g of gas may be released by the arc in a switching operation to avoid undue pressure peaks in the switching tube. If the quantity is contained in oxide inclusions which are reached and dissociated by the arc during quenching, one must deal with a liberated quantity of gas which impairs the switching capacity particularly at high currents with corresponding arcs of high energy density.

Tests with numerous variants of chromium-copper-based contact materials produced by singering and infiltration have shown oxide impurities with grain diameters up to 300 microns. The dissociation of these impurities would release a gas quantity of about 26 $\mu$g. The possibility of reducing the average grain size during screening of the starting powders is very limited, and furthermore decreasing grain size lowers the impregnability of the Cr skeleton and therefore the first-described type of defect occurs more frequently.

It may be assumed, therefore, that when using powder-metallurgically produced chromium-copper-based contact materials in power switches, malfunctions must be expected with statistical probability.

SUMMARY OF THE INVENTION

It is the object of the present invention to produce a copper-chromium-based material with at least 25%, to at most 60% chromium content by mass which is free of the above-mentioned macrodefects and which contains non-metallic inclusions and pipes at most in uniform microdistribution with dimensions not exceeding 50 microns and a total content under 0.5 volume-%.

According to the invention, as the starting material is being fused to form the fusion alloy, at least a partial zone of the instantaneous melt volume is superheated to at least 2000° C., and then the melt is cooled at a non-thermodynamic equilibrium rate such that a primary Cr precipitation or segregation does not occur.

In principle the above-mentioned disadvantages can be avoided by fusion alloys since perturbation sites caused by faulty impregnation do not occur in fusion alloys and therefore the danger of detachment of particles loosely bound in the impregnation structure from the contact surface is avoided. However, with existing casting methods it is impossible to produce copper-chromium fusion alloys with chromium contents of more than 25% by mass in the dimensions customary for contact materials, because even at a high cooling rate primary chromium precipitations and segregations will occur. Already from a chromium content of 20% by mass structure inhomogeneities appear which considerably intensify above 25% by mass, with formation of segregation effects. Chromium concentrations to close to the miscibility gap of 37% by mass and higher are not attainable at all by conventional casting methods in the dimensions customary for power switch contact pieces (greater than 50 mm diameter and less than 3 mm height).

However, this concentration range is of special interest in contact material for vacuum power switches, since it has been found that the 15% content by mass of chromium component possible with conventional casting methods results in a material which does not yet yield satisfactory values with respect to burnoff strength and weld force.

Because of these difficulties in attaining chromium concentrations above 25% by mass by fusion-metallurgical means, all high-chromium materials have previously been produced powder-metallurgically.

It has been found, surprisingly, that with fusion methods which locally introduce a high energy density into the melt material it is possible to produce by fusion-metallurgical means alloys with a high chromium component between 25% and 60% by mass, which have a uniform macrostructure and which contain precipitated chromium dendrites finely distributed in a copper matrix.

For melting the starting material to form the fusion alloy, arc, electron beam, laser, and high-frequency plasma melting have proven especially suitable. What all these methods have in common is that the actual melting process takes place in a restricted space of no more than a few square centimeters of melt surface and with energy densities per area of at least 5 kW/cm$^2$, so that superheating of the melt to more than 2000° C. is obtained. Besides, the site of energy introduction must move relative to the melt material surface so rapidly that, while a homogeneous melting of strictly localized regions is achieved, the cooling proceeds so rapidly that appearance of a thermodynamic equilibrium does not become effective.

Advantageously the starting material is produced by powder-metallurgical methods, such as by pressing and/or sintering of a copper-chromium powder mixture or by copper infiltration of a sintered chromium skeleton. The starting material may also be prepared as a composite material consisting of a copper jacket with a chromium powder filling. It is also possible to prepare the starting material from a copper bar with bores filled with chromium powder, or from a copper rod clad with chromium powder.

Carbon may be added to the starting material as a reduction agent, but not in an amount exceeding 1% by mass of carbon. To increase the getter capacity of the contact material, additions of the metals zirconium or titanium may be admixed to the starting material. As shield gas for the melt atmosphere rare gases such as helium and argon, have proven useful.

With the method according to the invention, copper-chromium materials can be produced which contain chromium components up to 60% by mass in even distribution in the form of finely divided dendritic precipitations. As a result of the high local energy introduction in the melt zone region at the same time any oxidic or other non-metallic impurities are fused, dissociated, and in part evaporated, a simultaneous purification effect occurs. The impurities which are only fused rather than evaporated separate out again, upon solidification, in the structure in a very finely divided form and in an order of magnitude which is harmless for the switching operation. The material shows a homogeneous macrostructure without defects or pipes and with a very good binding in of the dendritic chromium precipitations in the copper matrix. The content of non-metallic impurities is reduced as compared with the starting material, and it is precipitated uniformly in the structure with a small grain size.

To improve the reducing action on oxidic impurities, additions for example of hydrogen gas or carbon monoxide gas may be added to the shield gas.

Other features and advantages of the invention will be apparent from the following detailed description and from the claims.

For a full understanding of the present invention, reference should now be made to the following detailed description of the invention.

DETAILED DESCRIPTION

The invention will now be explained in greater detail with reference to the following examples:

EXAMPLE 1

From a powder mixture of 65% by mass of copper powder and 35% by mass of chromium powder a blank of a diameter of 80 mm and a length of 500 mm is pressed isostatically under a pressure of 3000 bar. It is thereafter sintered under vacuum at temperatures just below or, in the case of the formation of a liquid phase, about 50° C. above the melting point of copper. The sintered blank is used as a fusible electrode in an arc melting furnace and is remelted under helium as a shield gas, to which a few percent hydrogen or carbon monoxide may be admixed as reducing agents. To obtain the required high energy density, the arc current should, at the given dimensions, be at least 1000 A. The fused electrode material solidifies in a water-cooled copper chill mold. The resulting ingot is drawn off downwardly and the fusible electrode is fed from above.

EXAMPLE 2

A thick-walled copper pipe of OFHC copper is filled with chromium powder, so that the masses of the copper pipe and chromium powder are the same. Thereafter the pipe is closed at the ends and tapered in an extrusion molding tool for cross-section reduction and compaction of the chromium powder. This composite body is inserted as a fusible electrode in an arc furnace and remelted by the method described above in example 1.

EXAMPLE 3

A chromium-copper blank with a chromium content of about 50% by mass, which had been produced from chromium and copper powder by sintering and infiltration, is placed into a water-cooled copper chill mold and remelted under vacuum with an electron beam gun to a depth of a few millimeters. The electron beam, which may be pulsed, is guided over the blank continuously or intermittently in such a way that successively the entire switching surface of the future contact piece is remelted. However, at all times only a small fraction of material is in the liquid state at the same time that solidification can occur rapidly without the thermodynamic equilibrium being reached, so that a uniform macrostructure with finely divided precipitation of chromium dendrites is achieved.

EXAMPLE 4

A blank pressed from chromium and copper powder having a chromium content of about 45% by mass is sintered at about 1150° C. and subsequently infiltrated again with liquid copper for residual pore impregnation. Contact disks are machined from this disk. These disks are slightly oversize as compared with the final contact dimensions. The contact disks are then placed on a cooled rotatable plate and superficially remelted by an electrodeless high-frequency plasma burner to a depth of about 1 mm. All contact material portions are successively fused by the plasma torch by rotating the support plate. After removal by lathe of the surface roughnesses due to remelting, the contact disk can be used in the switching tube directly.

There has thus been shown and described a novel method of producing copper-chromium fusion alloys as contact material for vacuum power switches which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a method of producing copper-chromium fusion alloys having a chromium content of at least 25% by mass and at most 60% by mass with a homogeneous macrostructure without lattice defects and without shrink holes or pipes for use as contact material for vacuum power switches with breaking currents above 10 KA, wherein a starting material is prepared for the fusion process from the alloy components copper and chromium and then a melt is formed from this starting material, the improvement comprising the steps of:
    (a) superheating at least a partial zone of an instantaneous volume of said melt to at least 2000° C., thereby to fuse the starting material into the fusion alloy; and
    (b) rapidly cooling the melt at a non-thermodynamic equilibrium rate such that a primary Cr precipitation or segregation does not occur.

2. The method according to claim 1, wherein the starting material is fused in an arc melting furnace under a shield gas atmosphere.

3. The method according to claim 1, wherein the starting material is fused by means of electron beams.

4. The method according to claim 1, wherein the starting material is fused by means of laser beams under a shield gas atmosphere.

5. The method according to claim 1, wherein the starting material is fused by means of high-frequency plasma under a shield gas atmosphere.

6. The method according to claim 1, wherein the starting material is prepared by powder-metallurgical methods by pressing of copper-chromium powder mixtures.

7. The method according to claim 1, wherein the starting material is prepared by powder-metallurgical methods by sintering of copper-chromium powder mixtures.

8. The method according to claim 1, wherein the starting material is prepared by powder-metallurgical methods by pressing and sintering of copper-chromium powder mixtures.

9. The method according to claim 1, wherein the starting material is prepared by powder-metallurgical methods by copper infiltration of a sintered chromium skeleton.

10. The method according to claim 1, wherein the starting material is prepared as composite material from a copper jacket with a chromium powder filling.

11. The method according to claim 1, wherein the starting material is prepared from a copper bar with bores filled with chromium powder.

12. The method according to claim 1, wherein the starting material is prepared from a copper rod clad with chromium powder.

13. The method according to claim 1, further comprising adding to the starting material at most 1% by mass of carbon as a reducing agent.

14. The method according to claim 2, wherein a rare gas is used as a shield gas.

15. The method according to claim 4, wherein a rare gas is used as a shield gas.

16. The method according to claim 5, wherein a rare gas is used as a shield gas.

17. The method according to claim 14, further comprising adding hydrogen gas to the shield gas as a reducing addition.

18. The method according to claim 15, further comprising adding hydrogen gas to the shield gas as a reducing addition.

19. The method according to claim 16, further comprising adding hydrogen gas to the shield gas as a reducing addition.

20. The method according to claim 14, further comprising adding carbon monoxide gas to the shield gas as a reducing addition.

21. The method according to claim 15, further comprising adding carbon monoxide gas to the shield gas as a reducing addition.

22. The method according to claim 16, further comprising adding carbon monoxide gas to the shield gas as a reducing addition.

* * * * *